US007923092B2

(12) United States Patent
Rockwell

(10) Patent No.: US 7,923,092 B2
(45) Date of Patent: Apr. 12, 2011

(54) DIE CUT INSULATION BLANKET AND METHOD FOR PRODUCING SAME

(75) Inventor: Anthony L. Rockwell, Pickerington, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 330 days.

(21) Appl. No.: 11/209,005

(22) Filed: Aug. 22, 2005

(65) Prior Publication Data

US 2007/0042156 A1 Feb. 22, 2007

(51) Int. Cl.
*B32B 3/12* (2006.01)
*B32B 3/00* (2006.01)
*E04B 1/74* (2006.01)

(52) U.S. Cl. .......... 428/116; 428/73; 428/327; 428/192; 264/630; 52/404.1

(58) Field of Classification Search .................. 428/116, 428/670; 160/84.05; 5/502, 482; 52/635
See application file for complete search history.

(56) References Cited

U.S. PATENT DOCUMENTS 514,663 A 2/1894 Pitt
1,714,058 A 5/1929 Tirifahy
2,001,632 A * 5/1935 Schlichting .................... 428/118
2,254,837 A 9/1941 Burns
2,342,839 A 2/1944 Byers
2,542,840 A * 2/1951 Riddle ............................ 238/19
3,017,022 A * 1/1962 Amudson ..................... 206/325
3,461,026 A 8/1969 Schick
3,542,550 A * 11/1970 Leonard et al. ............... 430/350
3,557,901 A 1/1971 Young
3,591,351 A 7/1971 Ullman
3,642,550 A * 2/1972 Doll ................................ 156/78
3,642,967 A * 2/1972 Doll ................................ 264/51
3,655,501 A 4/1972 Tesch
3,673,057 A 6/1972 Fairbanks
3,781,183 A 12/1973 Doll
3,806,390 A 4/1974 Balk et al.
3,819,006 A 6/1974 Westlund
3,819,007 A 6/1974 Wirt
3,864,198 A 2/1975 Jackson (Continued)

FOREIGN PATENT DOCUMENTS

DE 42 27 957 2/1994

(Continued)

OTHER PUBLICATIONS

Annie's Pattern Club, Oct.-Nov. 1977, No. 53, pp. 10-13.*

(Continued)

*Primary Examiner* — D. Lawrence Tarazano
*Assistant Examiner* — Nicole T Gugliotta
(74) *Attorney, Agent, or Firm* — Calfee, Halter & Griswold LLP

(57) ABSTRACT

A blanket is provided including a first panel of material having a honeycombed portion that is expanded to form a second, projecting panel from the first panel material. The invention also includes a method of reducing the material needed to construct a multipanel structure. The method includes the steps of providing a first panel of material; honeycombing a portion of that first panel and expanding the honeycombed portion of the first panel to form a second panel projecting from the first panel. Advantageously, the second panel is formed from material of the first panel and no additional material is required.

30 Claims, 9 Drawing Sheets

U.S. PATENT DOCUMENTS

| | | | | |
|---|---|---|---|---|
| 3,900,648 | A | 8/1975 | Smith | |
| 3,950,474 | A | 4/1976 | Cunningham | |
| 3,966,044 | A | 6/1976 | Cunningham | |
| 3,985,600 | A | 10/1976 | Blais | |
| 4,001,473 | A | 1/1977 | Cook | |
| 4,007,388 | A | 2/1977 | Lawyer et al. | |
| 4,111,081 | A | 9/1978 | Hilliard | |
| 4,294,875 | A | 10/1981 | Schramm | |
| 4,295,637 | A * | 10/1981 | Hulek | 256/13.1 |
| 4,303,714 | A | 12/1981 | Mercer | |
| 4,303,747 | A * | 12/1981 | Bender | 429/161 |
| 4,363,739 | A | 12/1982 | Okamura et al. | |
| 4,384,020 | A | 5/1983 | Beggs | |
| 4,416,715 | A | 11/1983 | Schramm et al. | |
| 4,465,725 | A | 8/1984 | Riel | |
| 4,510,010 | A | 4/1985 | Schramm et al. | |
| 4,520,124 | A | 5/1985 | Abe et al. | |
| 4,556,593 | A | 12/1985 | Hughes | |
| 4,578,070 | A | 3/1986 | Holtman | |
| 4,615,671 | A | 10/1986 | Bernal | |
| 4,821,839 | A | 4/1989 | D'Antonio et al. | |
| 4,842,794 | A | 6/1989 | Hovis et al. | |
| 4,879,084 | A * | 11/1989 | Parnigoni | 264/295 |
| 4,879,152 | A | 11/1989 | Green | |
| 4,985,106 | A | 1/1991 | Nelson | |
| 5,002,427 | A | 3/1991 | Kambe et al. | |
| 5,044,705 | A | 9/1991 | Nelson | |
| 5,055,341 | A | 10/1991 | Yamaji et al. | |
| 5,056,341 | A | 10/1991 | Mori et al. | |
| 5,110,266 | A | 5/1992 | Toyoshima et al. | |
| 5,136,765 | A | 8/1992 | Tanaka et al. | |
| 5,139,596 | A | 8/1992 | Fell | |
| 5,151,018 | A | 9/1992 | Clendenin et al. | |
| 5,239,735 | A | 8/1993 | Tanaka et al. | |
| 5,272,285 | A | 12/1993 | Miller | |
| 5,374,118 | A | 12/1994 | Kruck et al. | |
| 5,379,568 | A | 1/1995 | Murray | |
| 5,432,306 | A | 7/1995 | Pfordresher | |
| 5,461,761 | A | 10/1995 | Knopfli et al. | |
| 5,496,610 | A | 3/1996 | Landi et al. | |
| 5,503,172 | A | 4/1996 | Hedeen et al. | |
| 5,515,702 | A | 5/1996 | Park | |
| 5,543,198 | A | 8/1996 | Wilson | |
| 5,547,743 | A | 8/1996 | Rumiesz, Jr. et al. | |
| 5,705,252 | A | 1/1998 | Lea et al. | |
| 5,714,107 | A | 2/1998 | Levy et al. | |
| 5,714,226 | A | 2/1998 | Disselbeck | |
| 5,755,900 | A | 5/1998 | Weir et al. | |
| 5,816,305 | A | 10/1998 | May | |
| 5,848,509 | A | 12/1998 | Knapp et al. | |
| 5,894,044 | A | 4/1999 | Norcom et al. | |
| 5,897,951 | A | 4/1999 | Gallagher et al. | |
| 5,965,851 | A | 10/1999 | Herreman et al. | |
| 6,294,287 | B1 | 9/2001 | Lee et al. | |
| 6,319,444 | B1 | 11/2001 | Kirk | |
| 6,332,823 | B1 * | 12/2001 | Rouse, Jr. | 446/220 |
| 6,512,831 | B1 | 1/2003 | Herreman et al. | |
| 6,539,955 | B1 | 4/2003 | Tilton et al. | |
| 6,669,265 | B2 | 12/2003 | Tilton et al. | |
| 6,673,415 | B1 * | 1/2004 | Yamazaki et al. | 428/117 |
| 6,726,974 | B1 | 4/2004 | Pflug et al. | |
| 6,736,470 | B2 | 5/2004 | Manke et al. | |
| 6,793,037 | B1 | 9/2004 | Babuke et al. | |
| 6,973,702 | B2 | 12/2005 | Harashige | |
| 2001/0033923 | A1 | 10/2001 | Mulder et al. | |
| 2002/0010229 | A1 * | 1/2002 | Medoff et al. | 523/129 |
| 2002/0134615 | A1 | 9/2002 | Herreman et al. | |
| 2003/0096548 | A1 | 5/2003 | Groitzsch et al. | |
| 2004/0109994 | A1 | 6/2004 | Ma et al. | |
| 2004/0116027 | A1 | 6/2004 | Termonia et al. | |
| 2005/0092353 | A1 | 5/2005 | Retsema | |
| 2005/0123720 | A1 * | 6/2005 | Suzuki et al. | 428/131 |
| 2005/0150720 | A1 | 7/2005 | Tudor et al. | |
| 2006/0000186 | A1 | 1/2006 | Carlson et al. | |
| 2006/0008614 | A1 * | 1/2006 | Rockwell et al. | 428/116 |
| 2006/0008616 | A1 * | 1/2006 | Dean et al. | 428/117 |
| 2006/0162997 | A1 | 7/2006 | Cooksey et al. | |
| 2007/0042156 | A1 | 2/2007 | Rockwell | |
| 2007/0054090 | A1 * | 3/2007 | Rockwell | 428/136 |
| 2008/0067002 | A1 | 3/2008 | Pfaffelhuber et al. | |

FOREIGN PATENT DOCUMENTS

| | | |
|---|---|---|
| DE | 4225278 | 2/1994 |
| DE | 199 07 146 | 8/2000 |
| DE | 101 18 632 | 10/2002 |
| EP | 0 352 993 | 1/1990 |
| EP | 0718570 | 6/1996 |
| EP | 0 933 131 | 4/1999 |
| EP | 1 277 865 | 1/2003 |
| EP | 1 772 480 | 4/2007 |
| EP | 2 022 678 | 2/2009 |
| FR | 2214932 | 8/1974 |
| GB | 1 515 455 | 6/1978 |
| GB | 2 122 540 | 1/1984 |
| JP | 61246542 | 11/1986 |
| JP | 3237961 | 10/1991 |
| JP | 8049871 | 2/1996 |
| JP | 02000255587 A | 9/2000 |
| WO | WO 00/32382 A1 | 6/2000 |
| WO | WO 2006/017297 | 2/2006 |

OTHER PUBLICATIONS

International Search Report PCT/US2007/005103 dated Sep. 12, 2007.

Intenational Search Report PCT/US2006/032597 dated Mar. 21, 2007.

International Search Report PCT/US2009/050991 dated Nov. 4, 2009.

International Search Report PCT/US2009/052652 dated Feb. 16, 2010.

Office Action from Chinese Patent Application No. 200680030595.9, dated Aug. 21, 2009, 6 pages.

* cited by examiner

DIE CUT INSULATION BLANKET AND METHOD FOR PRODUCING SAME

TECHNICAL FIELD AND INDUSTRIAL APPLICABILITY OF THE INVENTION

The present invention relates generally to an insulation blanket of multipanel construction that may be made utilizing less material and a method for producing that blanket.

BACKGROUND OF THE INVENTION

Perforated non-woven fabrics of polymer material are well known in the art. Representative examples include U.S. Pat. No. 5,714,107 to Levy et al.; U.S. Pat. No. 4,615,671 to Bernal and U.S. Pat. No. 3,864,198 to Jackson. In each of these prior art patents the polymer material is slit or cut and then subjected to stretching to provide a honeycomb web or open cell structure.

Unfortunately, the stretching of the material to open the honeycomb or cellular structure leads to the tearing of a significant number of the fiber to fiber bonds thereby reducing the strength and integrity of the resulting material. Further, the friability of the material is also increased by the tearing of so many bonds. Thus, erection of the honeycomb web or cellular material in accordance with prior art methods leads to two significant detrimental results.

Copending U.S. patent application Ser. No. 10/889,443 filed on 12 Jul. 2004 and Ser. No. 11/024,081 filed on 28 Dec. 2004 (owned by the assignee of the present invention) disclose a honeycomb web precursor and a method of producing a honeycomb web of polymer material wherein the precursor is erected by unfolding rather than stretching. Accordingly, the resulting product has improved fiber to fiber bond integrity and exhibits reduced friability when compared to prior art cellular structures.

The present invention utilizes this improved technology in a new way in order to allow one to construct a multipanel structure with reduced material. In essence, a portion of the material used to construct a one panel structure is expanded to also make a second projecting panel.

SUMMARY OF THE INVENTION

In accordance with the purposes of the present invention as described herein, a method is provided for reducing the material needed to construct a multipanel structure. The method comprises the steps of providing a first panel of material, honeycombing a portion of that first panel and then expanding that honeycombed portion to form a second panel projecting from the first panel. The second panel is formed from the material of the first panel. Accordingly, the second panel is constructed using less material than if a full panel were used resulting in significant material savings which in turn lowers overall production costs.

More specifically describing the method, the step of honeycombing includes cutting a first line partially across the first panel, cutting a second line partially across the first panel spaced from the first line and cutting the portion of the panel between the first and second lines. The method also includes the steps of selecting the material from a group consisting of non-woven synthetic material, non-woven natural material and mixtures thereof. More specifically, the material may be selected from a group consisting of thermoplastic fiber materials, thermosetting fiber materials, bicomponent fiber materials and mixtures thereof. Still more specifically the materials may be selected from a group consisting of polyolefin, polypropylene, polyethylene, polyester, nylon, rayon, polyethylene terephthalate, polybutylene terephthalate, cotton, kenaf, silk, cellulose, hemp, shoddy and mixtures thereof.

In accordance with yet another aspect of the present invention a blanket is provided. That blanket comprises a first panel of material having a honeycombed portion that is expanded to form a second, projecting panel from the first panel. The blanket material is selected from a group consisting of non-woven synthetic material, non-woven natural material and mixtures thereof. Further the material may be selected from a group consisting of thermoplastic fiber material, thermosetting fiber material, bicomponent fiber material and mixtures thereof. Still more specifically describing the invention the material may be selected from a group consisting of polyolefin, polypropylene, polyethylene, polyester, nylon, rayon, polyethylene terephthalate, polybutylene terephthalate, cotton, kenaf, silk, cellulose, hemp, shoddy and mixtures thereof.

The material may also include reinforcing fibers. Those reinforcing fibers may be selected from a group consisting of glass fibers, metal fibers, mineral fibers, carbon fibers, graphite fibers, natural fibers and mixtures thereof.

More specifically describing one possible embodiment of the present invention the honeycombed portion includes a series of branched slits. The series of branched slits at least partially nest with one another. Each of the branched slits is substantially Y-shaped. Adjacent branched slits define an expansion rib.

In accordance with yet another embodiment of the invention the honeycombed portion includes alternating rows of (a) straight slits and (b) openings with extension slits defining a four-way living hinge at a convergence of adjacent straight slits and the openings.

In the following description there is shown and described two possible embodiments of the present invention simply by way of illustration of two of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention, and together with the description serves to explain certain principles of the invention. In the drawing.

Reference will now be made in detail to the present preferred embodiment of the invention, an example of which is illustrated in the accompanying drawing.

DETAILED DESCRIPTION AND PREFERRED EMBODIMENTS OF THE INVENTION

Figure 1:
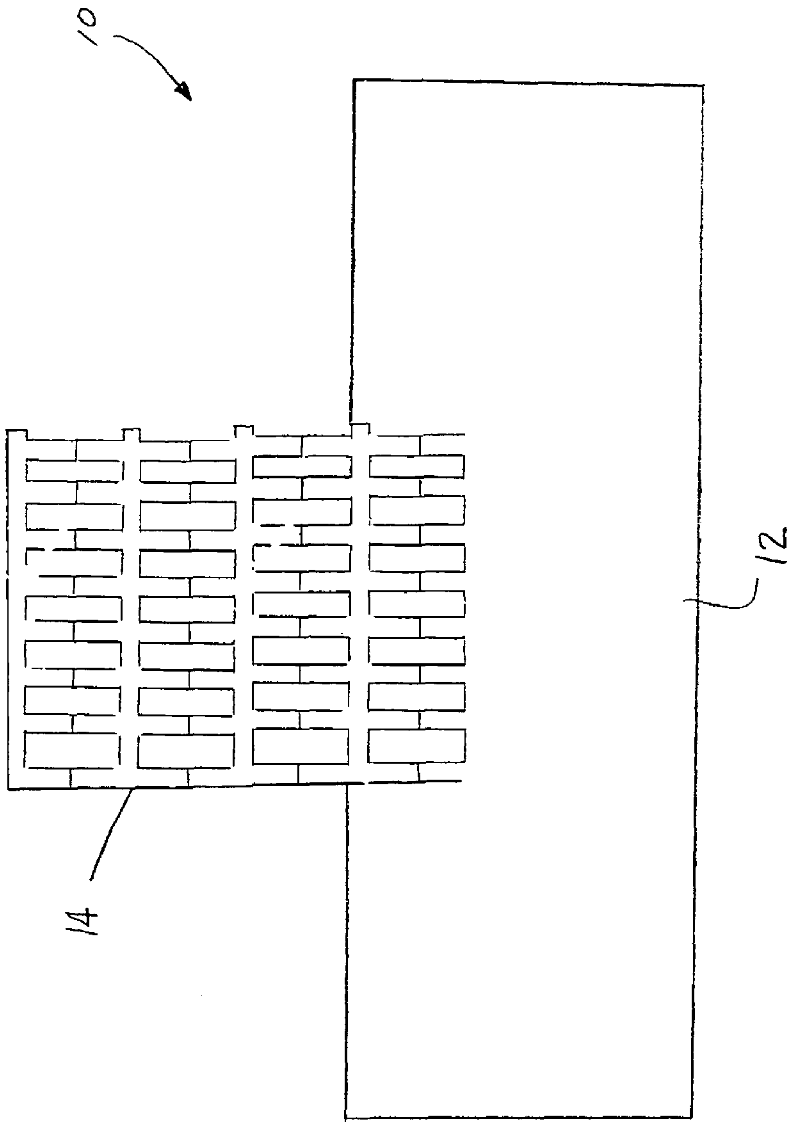
FIG. 1 is a top plan view of the fully expanded or erected blanket of the present invention.

Reference is now made to FIG. 1 illustrating a first embodiment of the blanket 10 of the present invention. As illustrated the blanket 10 comprises a sheet or first panel 12 constructed from an appropriate material. A typical material useful in the construction of the blanket 10 of the present invention is a non-woven synthetic material, a non-woven natural material and mixtures thereof. The material may include thermoplastic fiber material, thermosetting fiber material, bicomponent fiber material and mixtures thereof. Various polymers are particularly useful in the present invention. Still more specifically the material may be selected from a group consisting of polyolefin, polypropylene, polyethylene, polyester, nylon, rayon, polyethylene terephthalate, polybutylene terephthalate, cotton, kenaf, silk, cellulose, hemp, shoddy and mixtures thereof.

In the illustrated embodiment the panel 12 includes a portion 14 that has been honeycombed and expanded or erected to form a second panel 16 projecting from the first panel 12. As should be appreciated from the following description, the second panel 16 is formed from some of the material originally forming the portion 14 of the first panel 12.

Figure 2:
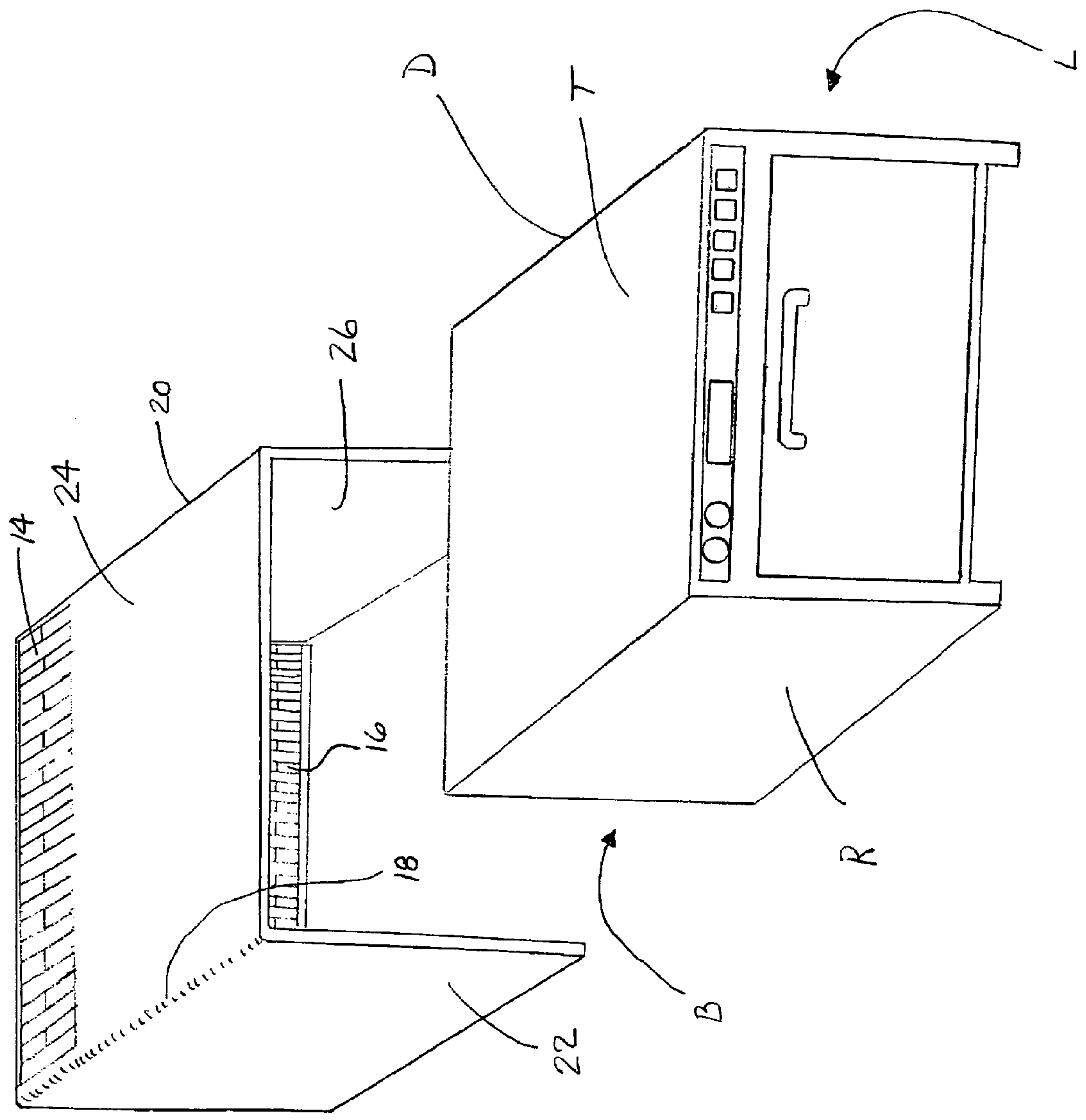
FIG. 2 is an exploded, perspective view illustrating how that blanket is folded in order to insulate the top wall, rear wall and sidewalls of an electrical appliance such as a dishwasher or oven.

As illustrated in FIG. 2, the T-shaped blanket 10 of the present invention is particularly useful for insulating applications. Accordingly, the blanket 10 is typically made from material providing acoustical insulation performance characteristics suited to a particular application. As illustrated in FIG. 2 the blanket 10 is utilized to insulate the top wall T, right sidewall R, left sidewall L and rear wall B of an electrical appliance such as a dishwasher or oven D. More specifically, the first panel 12 is divided into three sections by two fold lines 18 and 20. The first section 22 is connected to the second section 24 by the fold line 18 and the second section 24 is connected to the third section 26 by the fold line 20. The blanket 10 is folded so that the first section 22 is received over and insulates the right sidewall R. The second section 24 is received on and insulates the top wall T. The third section 26 is folded along the fold line 20 so as to be received over and insulate the left sidewall L.

In the illustrated embodiment the honeycombed portion 14 is provided in the second section 24 of the first panel 12. The honeycombed portion 14 is erected or expanded in order to create the second panel 16 that is unfolded to overlie and insulate the rear wall B of the dishwasher or oven D. Even though the second panel 16 is honeycombed and includes a series of spaced geometric openings, it still provides good insulation properties since it isolates the housing of the dishwasher or oven D from contact with the cabinet or wall adjacent which the dishwasher is mounted. Accordingly, vibration and noise are damped and suppressed.

Figure 3:
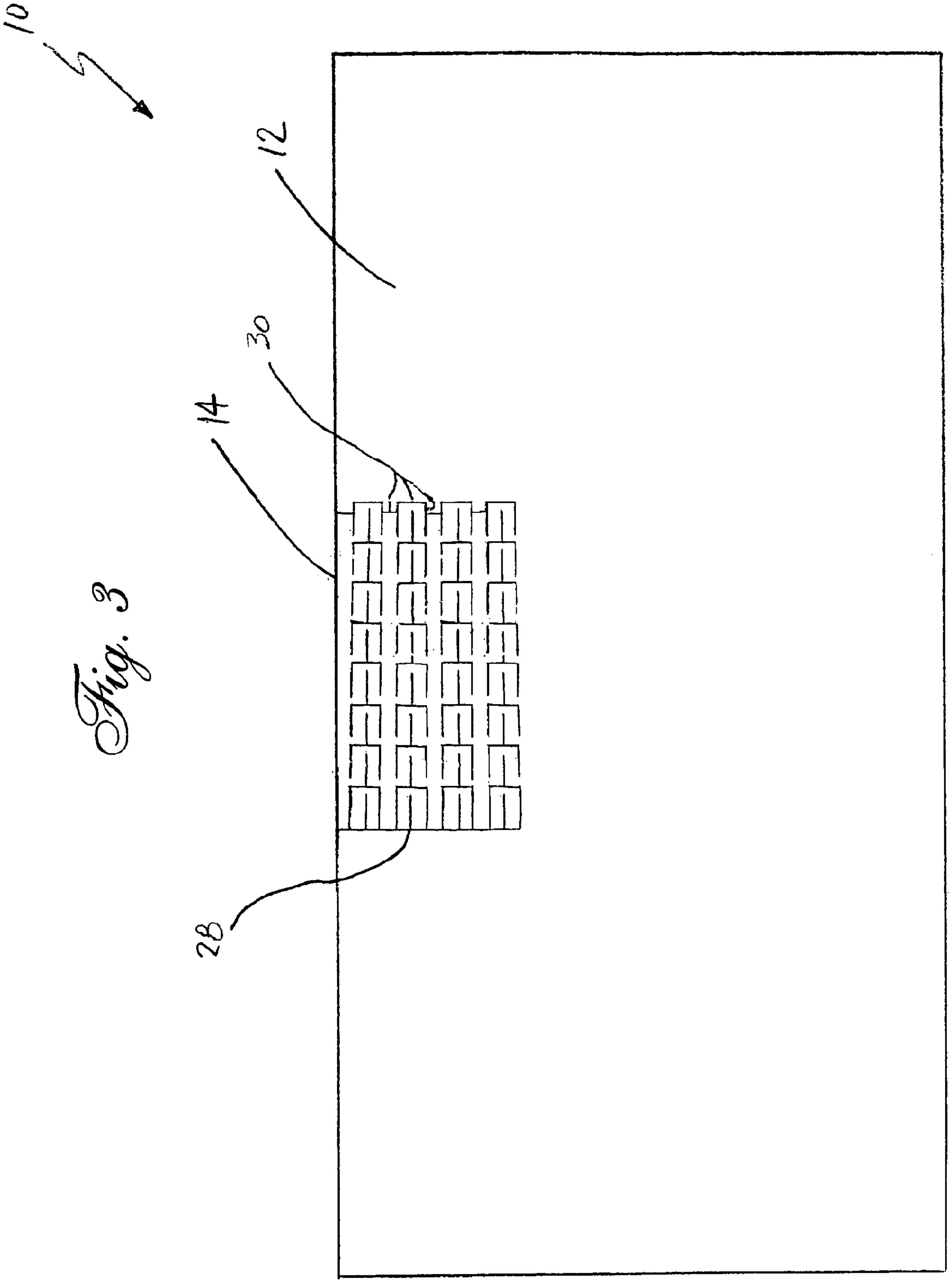
FIG. 3 is a top plan view similar to FIG. 1 but illustrating the unerected blanket of single panel construction with a die cut honeycombed portion that may be subsequently expanded to form a second, projecting panel without utilizing additional blanket material.

Reference is now made to FIG. 3 in order to illustrate the method of the present invention which allows one to construct a multipanel structure with less material. The method includes the step of providing a first panel 12 made from the desired material such as acoustical insulation with desired properties for a particular application. The first panel 12 is of the desired length and width to meet application needs. Thus, with respect to the application illustrated in FIG. 2, the first panel 12 has a length and width necessary to cover the right sidewall R, the top wall T and the left sidewall L of the dishwasher or oven D.

The next step of the method is the honeycombing of a portion 14 of the first panel 12. The honeycombing is performed by cutting a first line 28 across the first panel 12, cutting a second line 30 (the line 30 is stepped in the illustrated embodiment) across the first panel 12 spaced from the first line and cutting the portion 14 of the first panel 12 lying between the first and second lines 28, 30. A die may be used to complete the cutting in one or multiple steps.

Figure 4B:
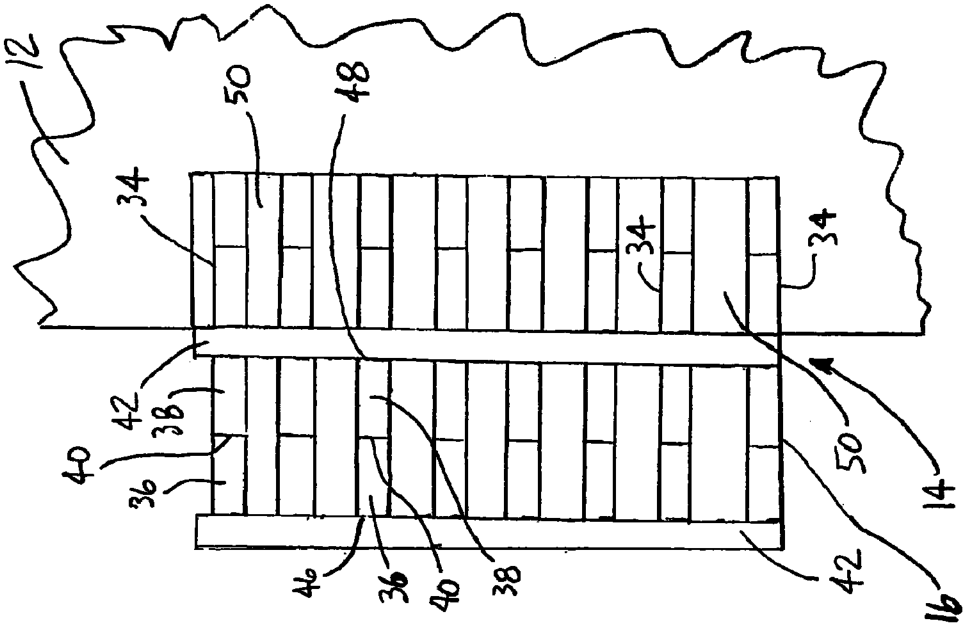
FIGS. 4*a* and 4*b* are top plan views respectively illustrating in detail a first embodiment of the honeycombed portion of the blanket of the present invention in folded and unfolded states.
Figure 4A:
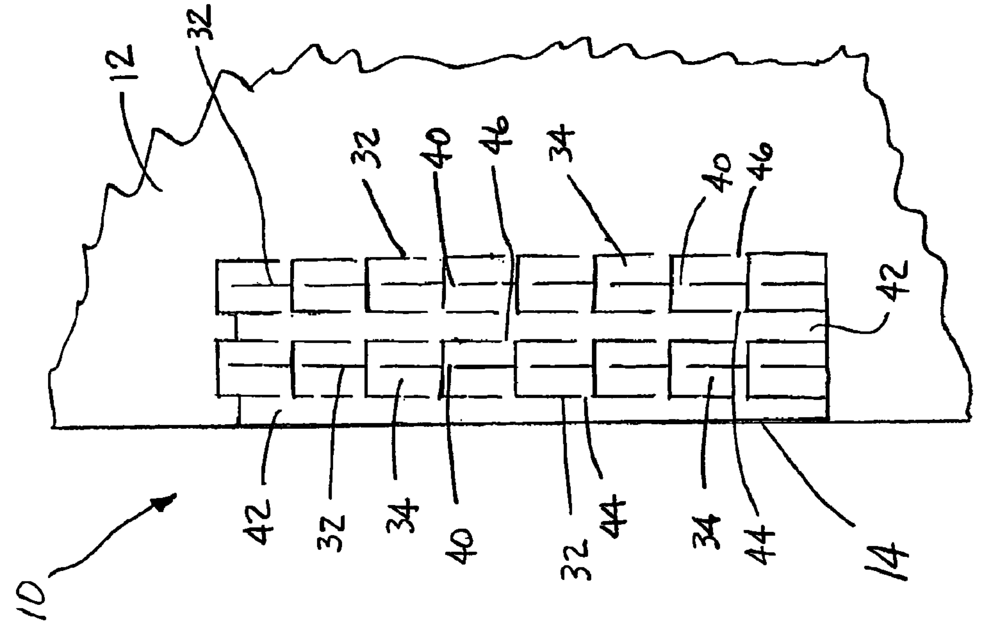

As illustrated in detail in FIGS. 4*a* and 4*b*, the portion 14 is cut to include a series of branched slits 32 that extend completely through the material of the portion 14. As illustrated in FIG. 4*a*, each branched slit 16 is substantially Y-shaped and the series of branched slits at least partially nest with one another.

As further illustrated in FIGS. 4*a* and 4*b*, adjacent branched slits 32 define an expansion rib 34. Each expansion rib 34 includes a first segment 36 and a second segment 38. The first segment 36 is connected end-to-end with the second segment 38 by a first living hinge 40. The opposite end of the first segment 36 is connected to a continuous strip 42 by a second living hinge 44. Similarly, a third living hinge 46 connects the opposite end of the second segment 38 to another, different continuous strip 42. Of course, the first row of segments 36 is connected to the main body of the first panel 12 so that when the second panel 16 is erected as illustrated in FIG. 4*b*, the second panel is securely attached to the first panel.

FIG. 4*b* shows the expanding of the honeycombed portion 14 and the erecting of the expansion ribs 34 so as to form the second panel 16. More specifically, each of the expansion ribs 34, in FIG. 4*a* is unfolded along the first, second and third living hinges 44, 46 and 48 so that the continuous strips 42 are separated and the expansion ribs are erected to extend straight between adjacent continuous strips (FIG. 4*b*). As a result, a series of open cells 50 are provided between adjacent expansion ribs 34 and continuous strips 42. Depending upon the size of the branched slits 32 provided in the honeycombed portion 14, the area covered by the geometric pattern of the erected honeycombed portion 14 compared to the original area of the honeycombed portion can be an increase of perhaps 150 to 500%.

If desired, the honeycombed portion 14 may be set in the erected condition in one of two ways. In the first the erected honeycombed portion 14 is heat treated above the thermoplastic and/or thermosetting fiber melt temperature and then cooled in order to thermally set the polymer material in the erected shape. Alternatively or in addition, a facing layer (not shown) may be adhered to a first face of the erected honeycombed portion 14. In yet another embodiment a second facing layer (not shown) may be adhered to a second facing of the erected honeycombed portion 14. In either of those embodiments, the facing layers are sufficiently rigid to hold the expansion ribs 34 in the expanded or erected condition thereby maintaining the cells 50 of the honeycombed portion 14 in a fully expanded condition. The first and second facing layers may be constructed from a number of materials including but not limited to polymer facings, foils, paper type facings, fiberglass reinforced mats, EVA (ester vinyl acetate), rubber materials and highly filled layers of material around a reinforced web as well as mixtures thereof.

Figure 5B:
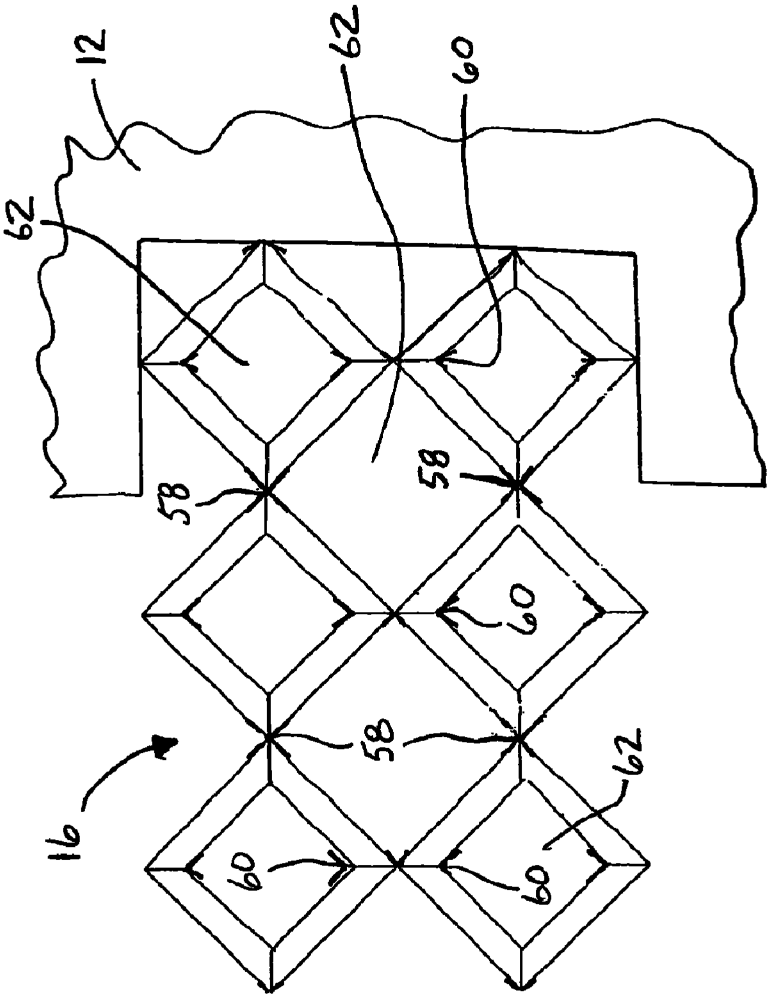
FIGS. 5*a* and 5*b* are top plan views respectively illustrating an unerected honeycomb portion and an erected honeycomb portion of a second embodiment of the present invention.
Figure 5A:
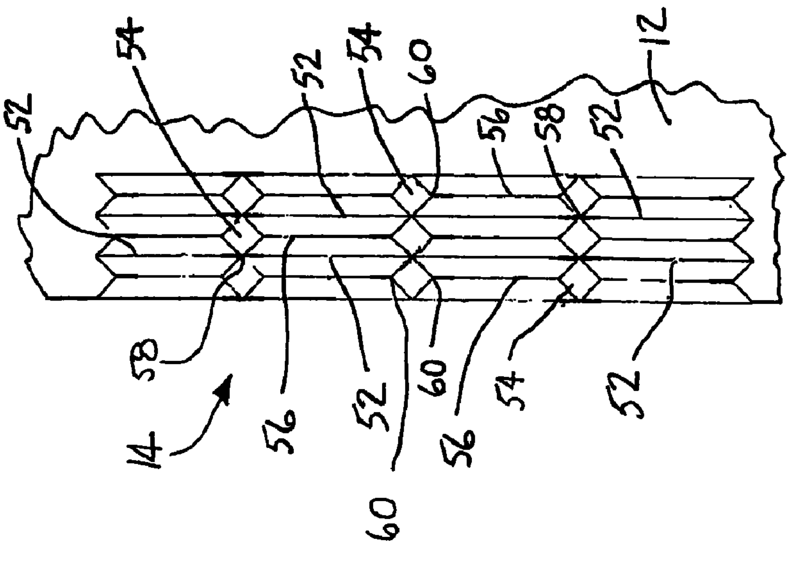

An alternative embodiment is illustrated in FIGS. 5*a* and 5*b*. In this embodiment the honeycombed portion 14 again comprises a body of acoustical insulating material such as a polymer material. In this embodiment of the invention the branched slits 32 of the FIG. 4*a* embodiment are replaced with alternating rows of (a) straight slits 52 and (b) openings 54 with extension slits 56 defining a four-way living hinge 58 at a convergence of adjacent straight slits and openings.

The FIG. 5*a* embodiment is erected by unfolding the honeycombed portion 14 about the four-way living hinges 58 provided at the convergence of adjacent straight slits 52 and openings 54 and the additional living hinges 60 provided at opposing corners of alternating openings 54 that do not define four-way living hinges 58. As illustrated in FIG. 5*b*, the erected honeycombed portion 14 includes multiple open cells 62. As with the earlier embodiment if desired for a particular application, the honeycombed portion 14 may be held in the erected position by thermally setting the material and/or adding one or two facing layers.

Figure 6A:
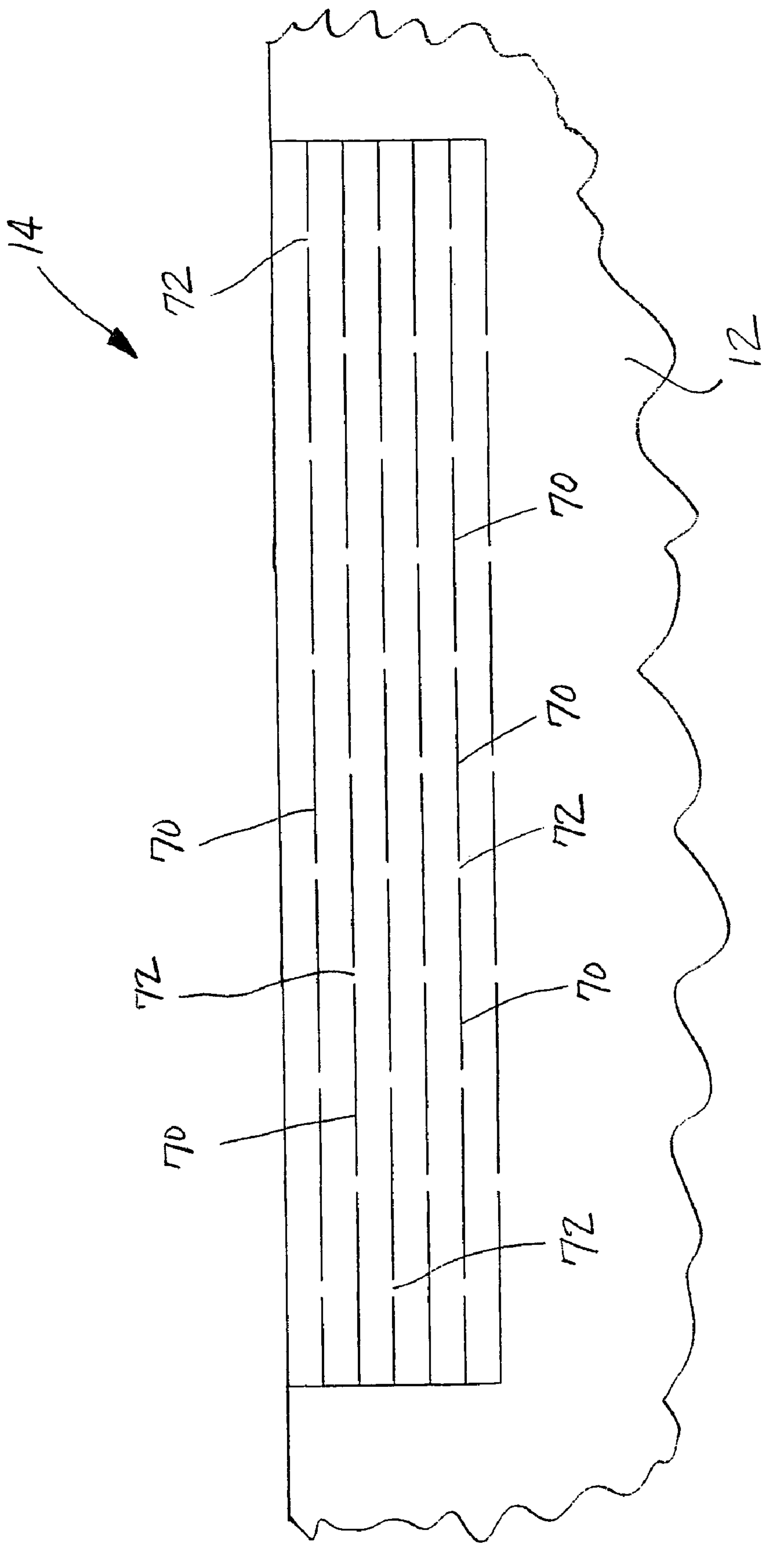
FIGS. 6*a* and 6*b* are top plan views respectively illustrating an unerected honeycomb portion and an erected honeycomb portion of a third embodiment of the present invention.
Figure 6B:
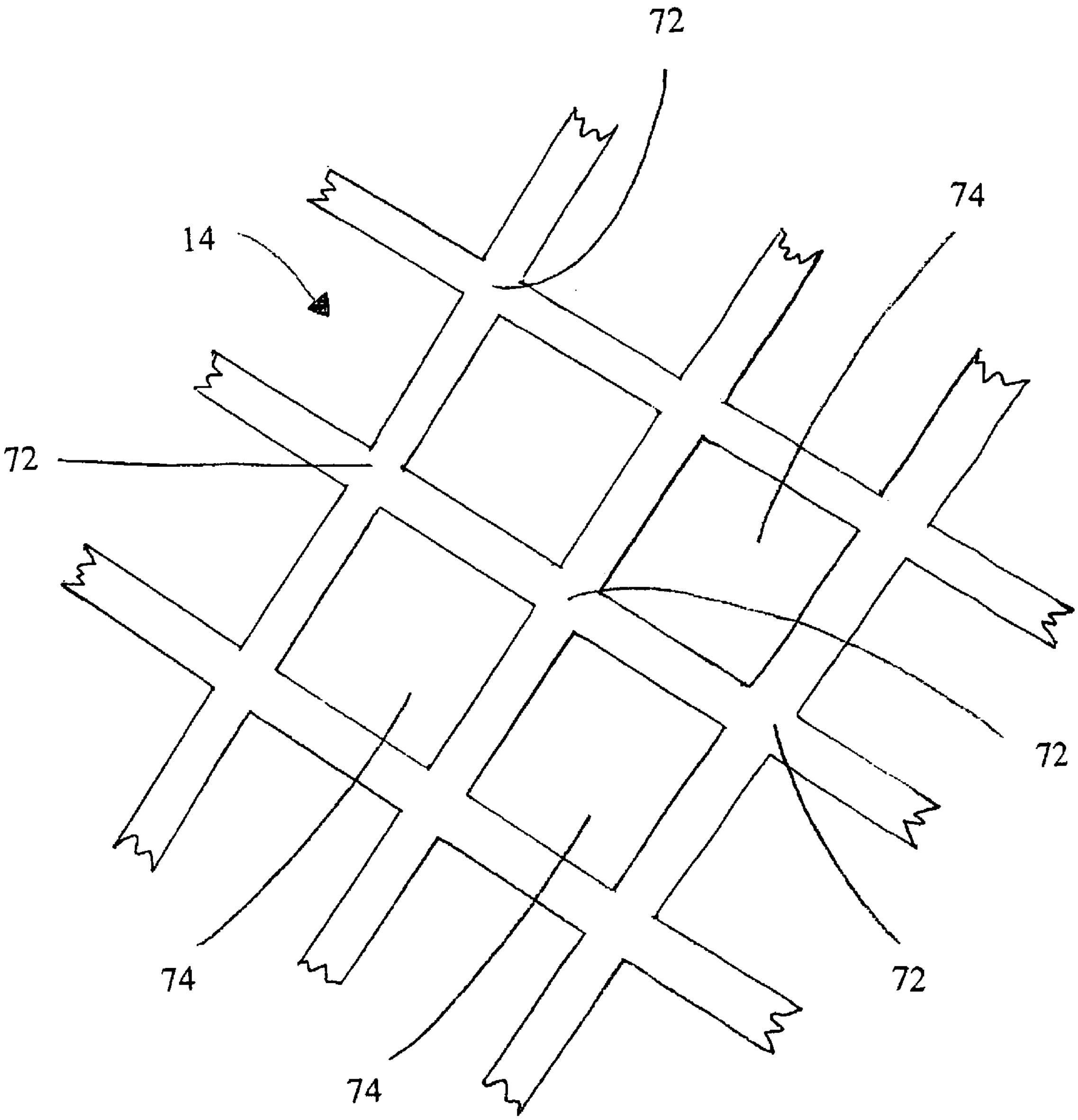

Yet another alternative embodiment is illustrated in FIGS. 6*a* and 6*b*. In this embodiment, the honeycombed portion 14 again comprises a body of acoustical insulating material such as a polymer material. As illustrated, the honeycombed portion 14 includes parallel rows of spaced slits 70. The spaces between the slits 70 define living hinges 72.

The honeycombed portion 14 shown in FIG. 6*a* is erected as illustrated in FIG. 6*b* by folding about the living hinges 72. The erected honeycombed portion 14 includes multiple open cells 74. As with the other embodiments, the honeycombed portion 14 may be held in the erected position by thermally setting the material and/or adding one or two facing layers.

Advantageously, the blanket 10 of the present invention may be made in line by feeding a roll of material to a forming station through a rotary die that honeycombs the portion 14. If desired, the product may be shipped in the unerected position thereby reducing the size and bulk of the blanket during shipping. The blanket 10 may then be subsequently erected to include the projecting second panel 16 at a remote manufacturing/production location.

Significantly, the blanket 10 of the present invention provides not only the first panel 14 but also a projecting second panel 16 without necessitating the use of additional material and substantially without sacrificing any acoustical insulation performance. In the past, it was necessary to weld or laminate a second and additional section of material to the first panel in order to provide the second, projecting panel. The cost and weight of this additional material is avoided utilizing the blanket 10 of the present invention.

Figure 7A:
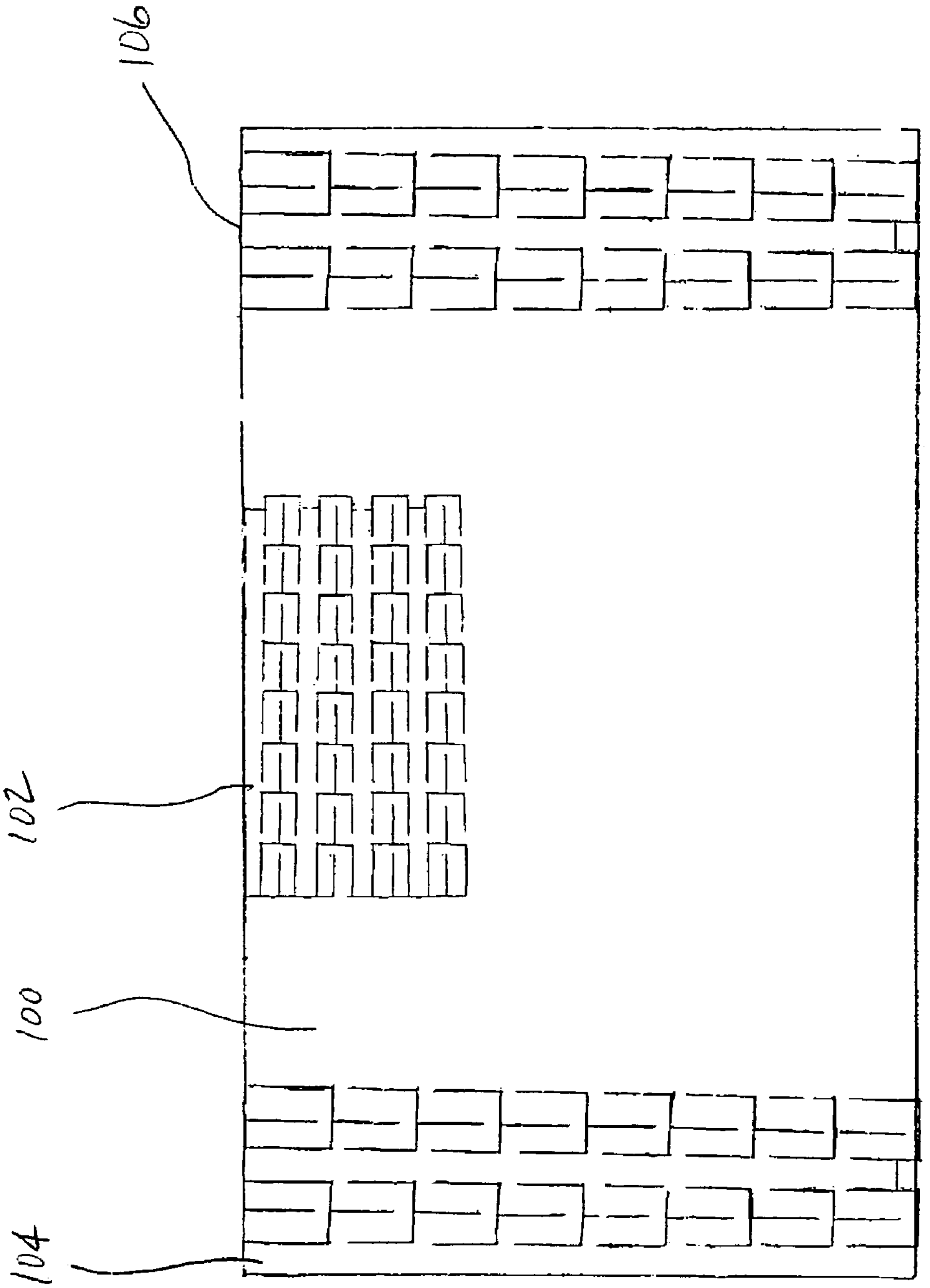
FIGS. 7*a* and 7*b* are top plan views of a panel including three honeycombed portions that expand into three additional projecting panels.
Figure 7B:
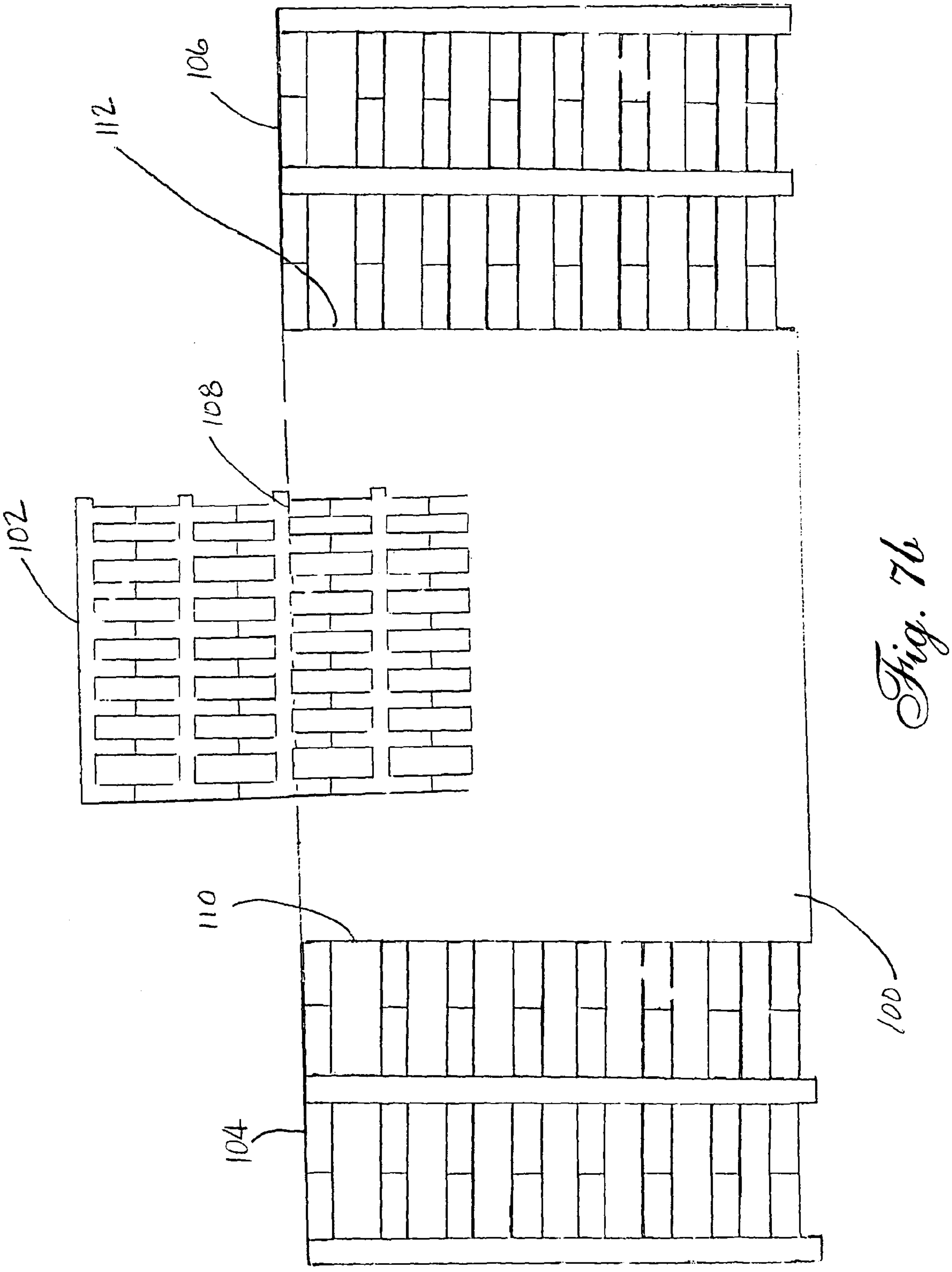

The foregoing description of the preferred embodiment of the invention has been presented for purposes of illustration and description. It is not intended to be exhaustive or to limit the invention to the precise form disclosed. Obvious modifications or variations are possible in light of the above teachings. For example, while a rotary die cutter may be utilized to cut the branched slits 16, other devices/methods could be utilized. These include but are not limited to cutting by water jet, laser and/or die rule. It should also be appreciated that one panel of material may be honeycombed to produce not just one but multiple additional panels. As illustrated in FIG. 7*a*, the single panel 100 includes three different honeycombed portions 102, 104 and 106. Each honeycombed portion 102, 104 and 106 may be expanded as illustrated in FIG. 7*b* and folded at the fold lines 108, 110 and 112 to form an additional projecting panel. In this way, it is possible to turn a single panel structure into a four panel structure without utilizing any additional material.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiment do not and are not intended to limit the ordinary meaning of the claims and their fair and broad interpretation in any way.

What is claimed:

1. A method of constructing a multipanel structure, the method comprising:

providing a first panel of material, said first panel having first, second and third sections, the second section disposed between the first and third sections, and the first, second and third sections aligned to form a boundary edge of said first panel; and honeycombing a portion of said second section of said first panel along said boundary edge to create an expandable, honeycombed portion of said second section that it can be expanded transversely from said first panel to project beyond said boundary edge to form a second panel; the first panel and expanded second panel forming a "T" shape.

2. The method of claim 1 wherein said honeycombing includes cutting a first line partially across the second section of said first panel, cutting a second line partially across said first panel spaced from said first line and cutting said portion of said first panel between said first line and said second line.

3. The method of claim 2 including selecting said material from a group consisting of non-woven synthetic material, non-woven natural material and mixtures thereof.

4. The method of claim 3, including selecting said material from a group consisting of thermoplastic fiber material, thermosetting fiber material, bicomponent fiber material and mixtures thereof.

5. The method of claim 2, including selecting said material from a group consisting of polyolefin, polypropylene, polyethylene, polyester, nylon, rayon, polyethylene terephthalate, polybutylene terephthalate, cotton, kenaf, silk, cellulose, hemp, shoddy and mixtures thereof.

6. A multi-panel blanket, comprising:

a first panel of material having three sections, the second section disposed between the first and third sections, the three sections having an edge defining a perimeter;

a second panel formed from an expandable, honeycombed portion of the second section of the first panel, at least a portion of said honeycombed portion projecting transversely from the second section of the first panel outside of said perimeter such that the first and second panels together form the shape of a "T".

7. The blanket of claim 6, wherein said material is selected from a group consisting of non-woven synthetic material, non-woven natural material and mixtures thereof.

8. The blanket of claim 7, wherein said material is selected from a group consisting of thermoplastic fiber material, thermosetting fiber material, bicomponent fiber material and mixtures thereof.

9. The blanket of claim 7, wherein said material is selected from a group consisting of polyolefin, polypropylene, polyethylene, polyester, nylon, rayon, polyethylene terephthalate, polybutylene terephthalate, cotton, kenaf, silk, cellulose, hemp, shoddy and mixtures thereof.

10. The blanket of claim 9, wherein said material includes reinforcing fibers selected from a group consisting of glass fibers, metal fibers, mineral fibers, carbon fibers, graphite fibers, natural fibers and mixtures thereof.

11. The blanket of claim 6, wherein said honeycombed portion includes a series of slits.

12. The blanket of claim 11 wherein each slit of said series of slits is branched.

13. The blanket of claim 12, wherein said series of branched slits at least partially nest with one another.

14. The blanket of claim 13, wherein each of said branched slits is substantially Y-shaped.

15. The blanket of claim 14, wherein adjacent branched slits define an expansion rib.

16. The blanket of claim 6, wherein said honeycombed portion includes alternating rows of (a) straight slits and (b) openings with extension slits defining a four-way living hinge at a convergence of adjacent straight slits and said openings.

17. The blanket of claim 6 including a second honeycombed portion that is expanded to form a third, projecting panel from said first panel material,

18. The blanket of claim 16 including a third honeycombed portion that is expanded to form a fourth, projecting panel from said first panel material.

19. A blanket, comprising:

a material comprising three sections, the second section disposed centrally between the first and third sections, the three sections defining a perimeter and having in said second section a region with a plurality of slits adjacent to the perimeter for creating a honeycombed portion when said region is expanded, and a substantially continuous region without slits, said honeycombed portion positioned within said perimeter when contracted and projecting transversely at least partially outside said perimeter when expanded.

20. The blanket of claim 19, wherein said material is T-shaped when expanded.

21. The method of claim 1, wherein said first panel of material is rectangular and said first and second panel combined is T-shaped.

22. The blanket of claim 6, wherein the material is T-shaped when the honeycombed portion is expanded.

23. A T-shaped insulation blanket, comprising:

a first panel of material having three sections, the second section being disposed centrally between the first and third sections;

a second panel projecting transversely from the first panel at said second section such that the first and second panels together form the shape of a "T"; wherein the second panel is formed from an expandable, honeycombed portion of the second section of the first panel.

24. The blanket of claim 23, wherein said material is selected from a group consisting of polyolefin, polypropylene, polyethylene, polyester, nylon, rayon, polyethylene terephthalate, polybutylene terephthalate, cotton, kenaf, silk, cellulose, hemp, shoddy and mixtures thereof.

25. The blanket of claim 23, further comprising at least one additional expandable honeycombed portion in said first panel.

26. The blanket of claim 23, wherein said honeycombed portion includes a series of branched slits that at least partially nest with one another.

27. A method for insulating an appliance having a top, a bottom and four sides, the method comprising:

providing a T-shaped insulation blanket comprising a first panel of material having three sections, the second section disposed between the first and third sections; and a second panel projecting transversely from the first panel at said second section such that the first and second panels together form the shape of a "T"; wherein the second panel is formed from an expandable, honeycombed portion of the second section of the first panel;

deploying said insulation blanket over said appliance such that the second section of the first panel insulates the top; the first and third sections of the first panel are folded over to insulate opposing sides of the appliance; and the second panel is expanded out by unfolding the honeycombed portion to insulate a third side of the appliance.

28. The method of claim 27, wherein said material is selected from a group consisting of polyolefin, polypropylene, polyethylene, polyester, nylon, rayon, polyethylene terephthalate, polybutylene terephthalate, cotton, kenaf, silk, cellulose, hemp, shoddy and mixtures thereof.

29. The method of claim 27, further comprising at least one additional expandable honeycombed portion in said first panel.

30. The method of claim 27, wherein said honeycombed portion includes a series of branched slits that at least partially nest with one another.

* * * * *